United States Patent [19]

Campbell et al.

[11] Patent Number: 4,787,919
[45] Date of Patent: Nov. 29, 1988

[54] MEMBRANE SEPARATION SYSTEM AND PROCESS

[75] Inventors: Michael J. Campbell, Clarence Center; James Smolarek, Boston; Timothy S. Van Lente, Buffalo, all of N.Y.

[73] Assignee: Union Carbide Corporation, Danbury, Conn.

[21] Appl. No.: 65,472

[22] Filed: Jun. 23, 1987

[51] Int. Cl.⁴ .............................................. B01D 53/22
[52] U.S. Cl. ........................................ 55/16; 55/20; 55/23; 55/27; 55/68; 55/158; 55/208; 55/269
[58] Field of Search ............... 55/16, 20, 23, 24, 27, 55/158, 208, 267–269

[56] References Cited

U.S. PATENT DOCUMENTS

| | | | |
|---|---|---|---|
| 2,494,554 | 1/1950 | Harlow | 55/16 X |
| 2,911,057 | 11/1959 | Green et al. | 55/16 X |
| 3,019,853 | 2/1962 | Kohman et al. | 55/16 |
| 3,062,905 | 11/1962 | Jennings et al. | 55/16 X |
| 3,100,868 | 8/1963 | McAfee, Jr. | 55/16 X |
| 3,336,730 | 8/1967 | McBride et al. | 55/16 |
| 3,777,809 | 12/1973 | Milde, Jr. | 55/16 X |
| 3,926,561 | 12/1975 | Lucero | 55/16 X |
| 3,930,813 | 1/1976 | Gessner | 55/16 |
| 3,930,814 | 1/1976 | Gessner | 55/16 |
| 3,979,190 | 9/1976 | Hedman | 55/16 X |
| 4,174,955 | 11/1979 | Blackmer et al. | 55/16 X |
| 4,406,673 | 9/1983 | Yamada et al. | 55/16 |
| 4,496,376 | 1/1985 | Hradek | 55/208 X |
| 4,560,394 | 12/1985 | McDonald et al. | 55/269 X |
| 4,632,677 | 12/1986 | Blackmer | 55/269 X |
| 4,698,073 | 10/1987 | Rohde et al. | 55/179 X |
| 4,698,075 | 10/1987 | Dechene | 55/179 X |

OTHER PUBLICATIONS

"Inert Gas Generation Systems for Offshore Platforms", Earl R. Beaver et al., American Institute of Chemical Engineers, 1986 Spring Meeting, Apr., 1986, New Orleans.

*Primary Examiner*—Robert Spitzer
*Attorney, Agent, or Firm*—Alvin H. Fritschler

[57] ABSTRACT

A membrane system is positioned within an insulated enclosure heated to maintain superheat conditions for the feed gas to the system, wherein individual membrane modules are not insulated. The feed gas compression heat is desirably used to supply the superheat to the feed gas within the insulated enclosure.

18 Claims, 2 Drawing Sheets

MEMBRANE SEPARATION SYSTEM AND PROCESS

BACKGROUND OF THE INVENTION

1. Field of the Invention

The invention relates to permeable membrane gas separation systems. More particularly, it relates to the prevention of condensation in such systems.

2. Description of the Prior Art

Permeable membranes capable of selectively permeating one component of a gas mixture are considered in the art as a convenient, potentially highly advantageous means for accomplishing desirable gas separations. To realize this potential in practical commercial operations, membrane systems must be capable of achieving and maintaining a desired degree of process efficiency, without undue maintenance or an unacceptable decrease in membrane life because of environmental factors associated with their use.

One such factor relates to the condensation of the constituents of the feed gas on the surface of the membrane. Such condensation can lead to lower permeation rates, corrosion, increased maintenance and decreased membrane life. In addition, condensation in membrane systems can result, in some instances, in a contamination of desired product streams. Because of such condensation, therefore, more membrane surface area is commonly required for a given gas separation operation. As a result, both capital costs and maintenance costs are increased over those that would be incurred for membrane systems free of condensation problems.

It is important, therefore, that efforts be made in the art to minimize or eliminate condensation in membrane systems. One approach that has been employed for this purpose is to superheat the feed to the membrane system and to individually insulate the membrane modules included in a membrane system in order to maintain the superheat conditions therein. The superheat is typically supplied from external sources, such as steam or electrical heaters. Another approach involves predrying the feed stream by means of an adsorbent or a refrigerant dryer to a temperature dew point that is lower than the membrane operating temperature.

While such approaches serve to minimize or eliminate condensation, it will be appreciated that the capital and operating costs associated therewith are relatively high. Preheaters thus typically require an external energy source, and the insulation for individual membrane assemblies is relatively expensive and can make access to the membrane for maintenance purposes troublesome. Dryer systems likewise tend to be expensive, both in terms of operating costs and capital expense.

While solutions to the problem of condensation in membrane systems have thus been developed, a need remains for further improvement in the art, such development to enable condensation to be minimized or eliminated at reduced initial capital cost and lower operating and maintenance costs than are obtainable in the prior art practices. Such improvement in the art would contribute to the technical and economic feasibility of the use of permeable membrane systems in a wide variety of commercially significant gas separation operations.

It is an object of the invention, therefore, to provide an improved membrane separation system and process in which the problem of condensation is obviated.

It is another object of the invention to provide a membrane separation system and process containing improved means for eliminating or minimizing condensation of feed gas constituents on membrane surfaces.

With these and other objects in mind, the invention is hereinafter described in detail, the novel features thereof being particularly pointed out in the appended claims.

SUMMARY OF THE INVENTION

An insulated heated enclosure is used to supply and/or contain superheat to feed gas being passed to a membrane system contained in said enclosure, such superheat serving to prevent condensation on the surfaces of the membrane material. It is not required that individual membrane modules be heated, or that the feed gas be preheated or predried before passage to the membrane system. Heat recovered from feed gas compression operations is desirably employed as said superheat.

BRIEF DESCRIPTION OF THE DRAWINGS

The invention is further described herein with reference to the accompanying drawings in which.

DETAILED DESCRIPTION OF THE INVENTION

Figure 1:
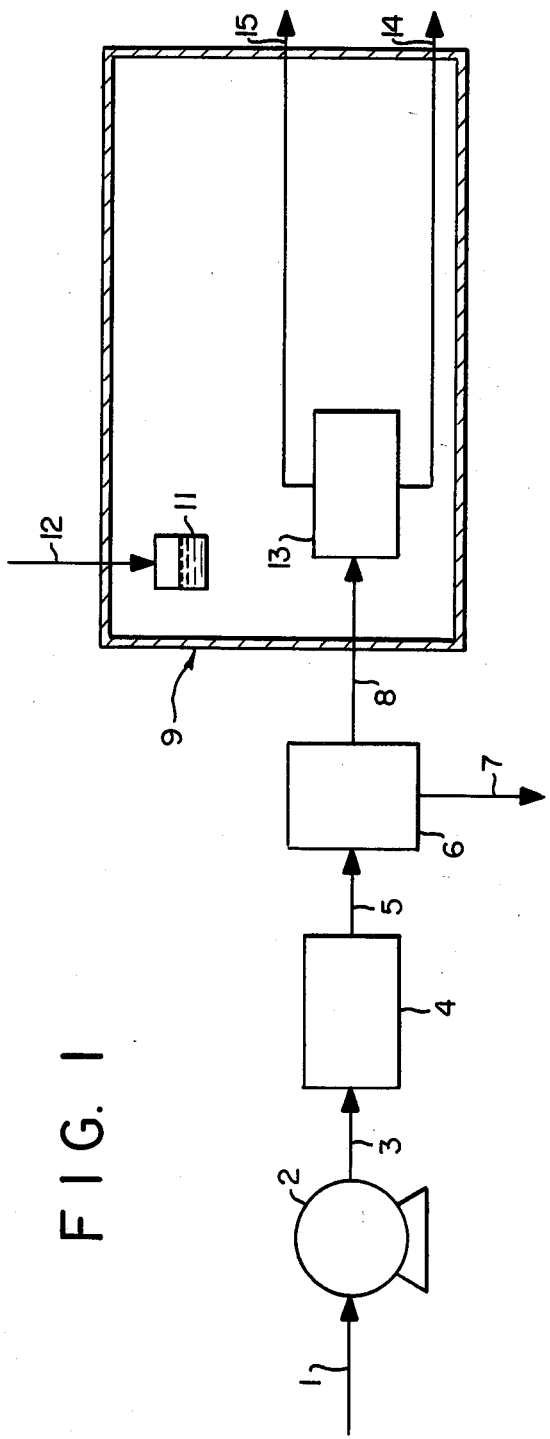
FIG. 1 is a schematic diagram of an embodiment of the temperature control system of the invention.

The objects of the invention are accomplished by installing the membrane system in its own separate enclosure, which is insulated and heated to maintain desired superheat for the feed gas being passed to the membrane system within the enclosure. The individual membrane modules comprising said membrane system thus do not require individual insulation. In the practice of the invention, capital and operating costs for condensation control are reduced. In addition, enhanced flexibility in the control of operating temperatures and in achieving process optimization is achieved.

The invention will be understood to apply with respect to any desired membrane structures capable of selectively permeating a more readily permeable component of a feed gas mixture containing said component and a less readily permeable component. Thus, membranes of the composite type, asymmetric type membranes or any other form of membrane configuration can be employed. Composite membranes generally comprise a thin separation layer or coating of a suitable permeable membrane material superimposed on a porous substrate, with the separation layer determining the separation characteristics of the composite structure. Asymmetric membranes, on the other hand, are composed essentially of a single permeable membrane material having a thin dense semipermeable skin that determines the separation characteristics of the membrane, and a less dense, porous, non selective support region that serves to preclude the collapse of the thin skin region under pressure. Such membrane structures may be prepared in a variety of forms, such as spiral wound, hollow fiber, flat sheet and the like.

For use in practical commercial operations, such membrane structures are commonly employed in membrane assemblies that are typically positioned within enclosures to form a membrane module that comprises the principal element of an overall membrane system. As used herein with reference to the invention, the membrane system comprises a membrane module or a number of such modules, arranged for either parallel or series operation. As indicated above, the membrane system is enclosed in a separate, insulated enclosure heated to maintain superheat conditions, with the individual modules in the system not requiring individual insulation as in prior art practice. The membrane modules can be constructed in the form of spiral wound cartridges, hollow fiber bundles, pleated flat sheet membrane assemblies, and other such assemblies common in the membrane industry. The membrane module is constructed so as to have a feed surface side and an opposite permeate exit side. In conventional modules, the enclosure portion thereof is constructed so as to enable the feed stream mixture to be brought into contact with the membrane feed-surface side. Conduit means are provided for the removal of the non-permeate portion of the feed stream, and for the separate removal of the permeate gas that has passed through the membrane.

While a wide variety of practical gas separation operations are susceptible to undesired condensation problems, the nature of the problem, and of the need for an improved process and system for maintaining a superheated, stable temperature environment for optimum operation of gas separation membrane systems is demonstrated herein with respect to air separation to produce a nitrogen-enriched product gas. In such air separation operations, there is a loss in membrane permeability, i.e. a loss in permeation rate, as the relative humidity of the air is increased. If, on the other hand, the feed air is heated so as to decrease its relative humidity, the permeation rate for the more readily permeable oxygen component of the air is increased. As the permeation rate is increased, it will be understood that less membrane surface area is required for a given gas separation, e.g. oxygen from nitrogen in said air separation case. Thus, as the feed gas becomes more superheated upon being heated to temperatures above its dew point temperature, the available membrane surface area requirements for the particular membrane system can be reduced, thus reducing the capital costs associated with the gas separation operation.

Numerous other problems can be caused by the build-up of water or other condensate in the membrane assembly. Corrosion can thus become a major problem, requiring additional initial capital expense for construction materials capable of withstanding such corrosion and/or increased maintenance cost. In addition, condensate build up can eventually carry over into the product gas stream, with consequent contamination of the product. In the case of air separation, water could condense in the membrane module and be carried over into the non permeate, nitrogen product stream. Water vapor, however, is highly permeable. If superheated, therefore, it would normally permeate through the membrane and exit from the system with other permeate waste product, i.e. the oxygen-enriched permeate gas stream in typical air separation operations.

In addition to such relative humidity and condensation effects on membrane performance, the membrane operating temperature also has a significant effect on membrane performance. Thus, the capacity of a membrane system per unit area of membrane surface and the capacity per unit of feed gas vary significantly with operating temperature. As the temperature increases, the capacity per unit area increases, but the capacity per unit of feed gas decreases. As a result, more product gas can be produced for a given membrane surface area at higher operating temperatures, but proportionately more feed gas is required under such higher temperature conditions. Such an increase in feed gas requirements necessarily means that a larger air compressor is required, and greater amounts of power are consumed. At lower operating temperatures, the opposite effect occurs, and the compressor and power requirements are lower, but a greater amount of membrane surface area is required for a given gas separation operation.

With due consideration to such temperature effects, it is, of course, highly desirable that the membrane system design be optimized with respect to surface area and feed gas requirements for a particular operating temperature. Once the membrane system has been designed, it is important to be able to maintain the system at the design temperature during ordinary commercial operations. It is also desirable to have the ability to change the operating temperature of the system to better satisfy the production and/or purity requirements during periods of reduced demand, a turndown from design conditions. The practice of the invention provides a desirable flexibility in the modifying of the operating temperature between the design temperature and temperature desired at various turndown conditions, or between one turndown temperature and another, or even between such temperatures and temperatures in excess of said design temperature. As will be appreciated from the disclosure hereof, the invention provides a convenient, low cost, efficient means for providing a constant, stable, flexible, superheat environment for gaseous separation permeable membrane systems.

For the purposes of the invention, a low-cost enclosure, or building, is installed over the membrane system, typically comprising a number of membrane modules. The enclosure is insulated using typical building construction insulating material, such as, for example, 3" or 6" of R-11 or other typical fiberglass or other suitable insulation material. The enclosure will be understood to be large enough to permit operating personnel to enter the enclosure for servicing of the membrane system positioned therein. The enclosure may be constructed of sheet metal or any other suitable material and lined with such insulation. Various appropriate safety features will also be included as part of the enclosure structure, such as vents, fans, snif ports and the like. For ease of utilization, the enclosure will also be provided with suitable doors or like means for facilitating installation and maintenance of the membrane system located therein.

With reference to FIG. 1 of the drawing, the invention is further described with reference to such an insulated enclosure that is heated by an external source of heat, such as steam, gas or electric heaters. In this embodiment, feed gas is passed in line 1 to a suitable compressor 2 for compression to a desired feed gas pressure. The compressed feed gas is then passed in line 3 to a suitable gas cooling zone 4 of conventional nature for cooling to below the design operating temperature level of the membrane system. Upon cooling, the feed gas will typically be supersaturated, i.e. it will be saturated with condensable vapor constituents thereof and also contain free liquid droplets. Thus, a feed air stream, at this point in an air separation process, will typically comprise compressed air at below design operating temperature together with water droplets. The feed gas is passed from said cooling zone 4 in line 5 to conventional water separator zone 6, of any desired type, for removal of any free water or other liquid droplets present in the feed gas stream. Separated liquid is removed from said separator zone 6 through line 7, while the feed gas is removed from said separator zone 6 through line 8. At this point, the compressed, cooled feed gas stream is typically saturated with said condensable vapor constituents thereof at the particular operating pressure, e.g. a feed air stream saturated with water vapor. The feed gas stream passes, in said line 8, into the heated, insulated enclosure 9 of the invention. The insulation layer of said enclosure is represented generally by the numeral 10, the doors, vents, fans, snif ports for the detection of gas leaks and the like are not shown on the drawing. Insulated enclosure 9 is heated, in the illustrative example, by heater means 11 positioned within the enclosure and that receives its heat by external means generally represented by the numeral 12.

The feed gas is passed in said line 8 to the permeable membrane system 13 within heated, insulated enclosure 9, for passage of the feed gas into the individual membrane modules (not shown) comprising said system in any desired series and/or parallel flow path. The more readily permeable component(s) of the feed gas mixture pass through the permeable membrane material in the membrane modules for discharge on the permeate exit side of the membrane system through line 14. The less readily permeable components of the feed gas mixture are removed from the membrane modules on the feed surface, or non-permeate, side thereof for discharge from membrane system 13 through line 15.

Those skilled in the art will appreciate that the feed gas is to be heated within insulated enclosure 9 to a superheat temperature, i.e. a temperature above the saturation temperature of the feed gas at the operating pressure of the membrane separation operation. For this purpose, the amount of heat added must be sufficient to superheat the feed gas and to compensate for heat losses from the insulated enclosure. The amount of feed gas superheat should generally be at least 3° F. and preferably at least 5° F. to ensure against undersirable condensation. The heat addition can be to the ambient within the insulated enclosure 9, by heater means 11, or directly to the feed gas as described below.

The practice of the invention is found to provide a number of significant advantages over the prior art as discussed above. Thus, the capital costs of the overall system can be decreased as compared with the prior art approach in which the feed gas is superheated directly and the individual membrane modules, e.g. bundles, are individually insulated to maintain the desired superheat conditions. This is particularly the case when multiple membrane module systems are employed. In addition, maintenance access to the modules is improved in the practice of the invention, wherein the modules are not individually insulated, as compared to the prior art practice of individual membrane module insulation.

It has also been found that a more even, stable temperature condition can be maintained throughout the overall membrane system using the heated, insulated enclosure approach of the invention than is the case using the prior art approach. The operating temperature of the membrane system is also found to be more easily adjustable by the changing of the overall temperature within the enclosure as contrasted to the direct heating of the feed gas individual module insulation approach of the prior art. Thus, the process and system of the invention allows desirably greater flexibility to be achieved tha has heretofore been obtainable in the optimization of the membrane system efficiency under variable operating conditions.

The advantages of the invention pertain whenever the membrane system operation for gas separation can be adversely affected by the condensation of constituents of the feed gas stream being procesed. The invention can also be practiced to advantage whenever the membrane system needs to be temperature controlled to optimize the overall process/membrane system operation. The advantages of the invention are further enhanced in embodiments, such as that described below, when the energy requirements of the gas separation operation can be advantageously reduced by the recovery of heat from the overall gas separation system.

Figure 2:
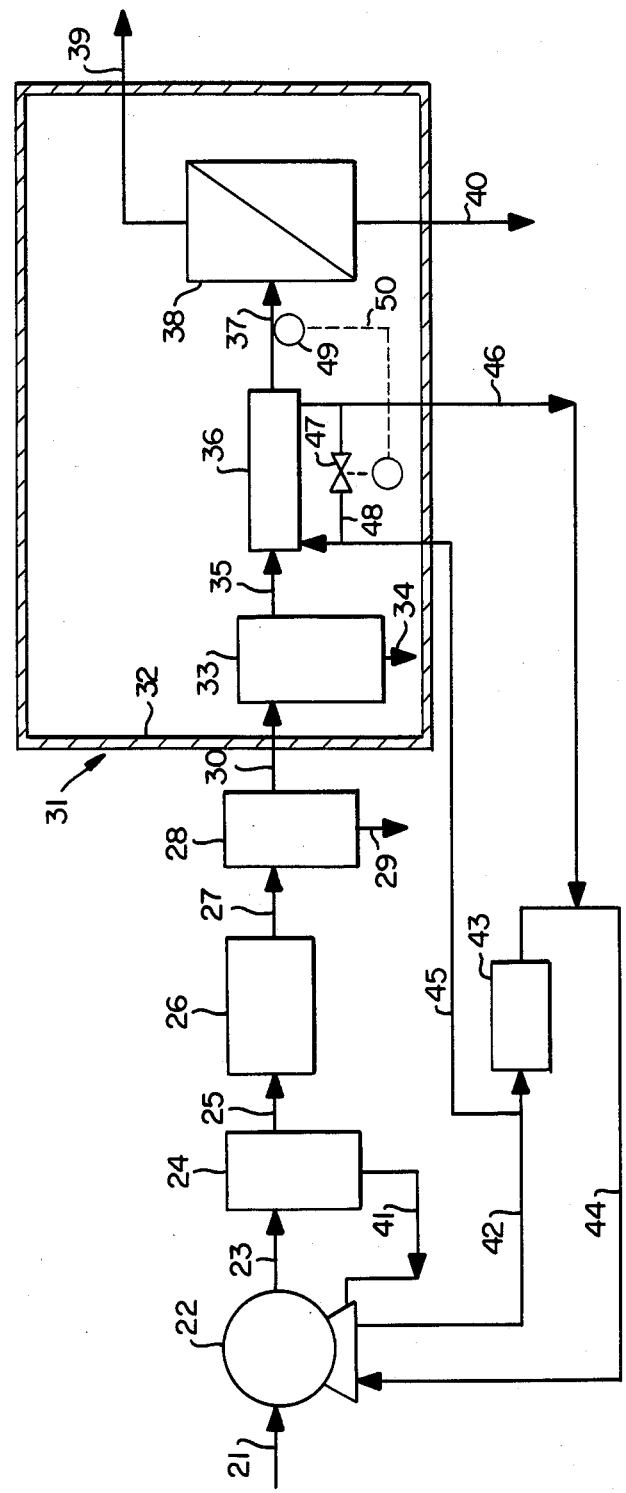
FIG. 2 is a schematic diagram of a preferred embodiment of said invention providing advantageous heat recovery and temperature control.

Referring to FIG. 2 of the drawing, the preferred embodiment illustrated therein will be seen to employ the insulated enclosure such as is described above and illustrated in the FIG. 1 embodiment. Instead of employing an external heating means to achieve and maintain the desired superheat conditions within the insulated enclosure, however, heat is recovered from the overall gas separation system itself, and this recovered heat is used to achieve superheat conditions within the membrane system, desirably by the direct heating of the feed gas within the insulated enclosure. Thus, feed gas from line 21 is passed to an oil-flooded screw compressor 22, from which compressed feed gas is passed in line 23 to a conventional oil separator 24. The thus treated feed gas stream is then passed in line 25 to after cooler unit 26, and in line 27 to a conventional liquid, e.g. water, separator 28. Condensed water or other liquid is removed from said separator through line 29. The feed gas stream is then passed through line 30 and enters insulated enclosure 31 of the invention. The insulation with which said enclosure is insulated is represented generally by the numeral 32.

Upon entering insulated enclosure 31, which will be understood to be adapted to control and/or minimize the loss of heat therefrom, the feed gas in line 30 is passed to coalescing filter zone 33 in which any residual oil droplets present in the feed gas are separated therefrom for removal through line 34. From said zone 33, the feed gas is passed in line 35 to heat exchanger zone 36, such as a shell and tube exchanger, where the feed gas is heated by hot oil from feed gas compressor 22. The outlet temperature of the gas is conveniently controlled by controlling the amount of oil sent through said heat exchanger zone 36. The degree of superheat desired is, therefore, readily adjustable to accommodate different dew point conditions or other factors pertaining to a given gas separation application. As noted above, the feed gas will, in any event, be superheated to a temperature above the saturation temperature of the feed gas at the desired operating pressure.

After superheating in said zone 36, the feed gas is passed through line 37 to the membrane modules of permeable membrane system 38 within said insulated enclosure 31, with the passage therethrough being in series or parallel flow patterns with respect to individual modules included within the system. As will be disclosed from the above, the modules, e.g. hollow fiber bundles, are not individually insulated. The less readily permeable component of the feed gas mixture is withdrawn from membrane system 38 at essentially the feed gas pressure level as non-permeable gas on the feed side of the system through line 39. The more readily permeable component of the feed gas is separately withdrawn at a lower pressure as permeate gas on the permeate side of the system through line 40.

It will be understood that oil separated from the compressed feed gas in oil separator 24 can be recycled through line 41 to said oil flooded screw compressor 22. The heat of compression associated with the use of said compressor 22 is recovered in this preferred embodiment and utilized instead of, or in addition to, external heat sources such as is shown with respect to the illustrated embodiment of FIG. 1. For this reason, an external heat source is not shown in FIG. 2, although it will be understood that such an external heat source can also be employed, together with the advantageous use of the recovered heat of compression within the system.

For withdrawing the heat of compression from compressor 22, heated oil is passed from said compressor in line 42 to oil cooler 43, from which cooled oil is returned to the compressor through line 44. For the heat utilization purposes of the invention, a portion of the oil in line 42 can be diverted through line 45, so as to bypass said oil cooler 43 for passage to said heat exchanger 36, outside or within insulated enclosure 31. Cooled oil leaving said exchanger is passed through line 46 to join with the cooled oil in line 44 for recycle to said compressor 22. The desirable control of the operating temperature in this embodiment may be readily achieved by the use of a suitable control valve positioned in by-pass line 48 to control the amount of heated oil desired to be passed to heat exchanger 36, with the remaining oil being passed through said line 48 for joining with the cooled oil being recycled from the heat exchanger through line 46. It will be appreciated that said control valve 47 can be operated in response to suitable temperature measurement means, such as gauge 49 in said line 37 leading to membrane system 38, with the numeral 50 denoting the conventional means of communication between said temperature gauge 49 and control valve 47.

Those skilled in the art will appreciate that various changes and modifications can be made in the details of the invention without departing from the scope of the invention as set forth in the appended claims. In the air separation application referred to above, it is common to employ a permeable membrane material capable of permeating oxygen as the more readily permeable component of the feed air stream. Nitrogen thus comprises the less readily permeable component of the feed air stream, and a nitrogen-rich product stream, if so desired, would be recovered as the non-permeate stream with the permeable gas comprising the residual oxygen-nitrogen stream that is enriched in oxygen as compared to the feed air stream. In other applications of the invention, it would be possible to use a permeable membrane material having the opposite permeation characteristics so that, for example in the air separation application, the permeable membrane would permeate nitrogen, rather than oxygen, as the more readily permeable component of the feed air stream. Those skilled in the art will appreciate that the improved membrane separation system and process of the invention is generally applicable to any desired gas separation operation in which condensation of feed gas constituents is a problem that is desirably to be overcome and/or operations in which it may otherwise be necessary or desirable to achieve a superheated, constant, stable temperature environment, with desirable temperature control capability beyond that obtainable using individually insulated membrane modules. The purification of hydrogen from an off-gas also containing methane, ethane and other hydrocarbons is an example of such gas separation applications, as are the recovery of hydrogen from ammonia purge gas and carbon dioxide and methane separations.

As indicated above, the permeable membranes comprising the membrane system positioned within the insulated enclosure of the invention may be in any desirable form, with hollow fiber membranes being generally preferred. It will be appreciated that the membrane material employed in any particular gas separation application can be any suitable material capable of selectively permeating a more readily permeable component of a gas or fluid mixture containing a less readily permeable component. Cellulose derivatives, such as cellulose acetate, cellulose acetate butyrate, and the like; polyamides and polyimides, including aryl polyamides and aryl polyimides; polysulfones; polystyrenes and the like, are representative examples of such materials. It will be understood in the art that numerous other permeable membrane materials are known in the art and suitable for use in a wide variety of separation operations. As noted, the membranes, as employed in the practice of the invention, may be in composite membrane form, in asymmetric form or in any such form that is useful and effective for the particular gas separation being carried out using the system and process of the invention.

By the effective and convenient overcoming of the condensation problems encountered in practical commercial operations, the invention thus provides a highly desirable advance in the membrane art as it pertains to gas separation operations. The invention also provides a highly desirable means for achieving a constant, stable temperature environment that further enhances the efficiency of the membrane system and process for gas separation, thus enabling permeable membranes to more effectively serve the need for practical and convenient means for achieving gas separations on a practical commercial basis.

We claim:

1. An improved air separation process comprising:
  (a) compressing a feed air stream containing condensible water vapor to a desired feed air pressure;
  (b) cooling said compressed feed air stream to below the design operating temperature level of the air separation process, thereby supersaturating the feed air so that the feed air stream comprises said feed air saturated with condensible water vapor together with free water droplets;
  (c) removing said free liquid droplets from the feed air stream;
  (d) passing the compressed, cooled feed air stream, free of water droplets, into an insulated enclosure adpated to control and/or minimize the lose of heat therefrom, without superheat of said feed air stream prior to its passage into said insulated enclosure and without predrying said feed air stream to a temperature dew point lower than said design operating temperature prior to said passage of the feed air stream into the insulated enclosure;
  (e) supplying sufficient heat within said insulated enclosure so as to superheat the feed air stream therein to a temperature where the saturation temperature thereof at the feed air pressure, said insulated enclosure serving to control and/or minimize the loss of heat therefrom such that any loss of heat is not greater than that being supplied within said insulated enclosure, so that the feed air within said insulated enclousre is mintained under superheat conditions at a temperature below its dew point to avoid undesired condensation of water present in the feed air within a permeable membrane system positioned within said insulated enclosure to effect the desired air separation;

(f) passing the thus-superheated feed air stream to said permeable membrane system positioned within said insulated enclosure, said permeable membrane system containing at least one membrane module capable of selectively permeating oxygen together with condensible water vapor, as a more permeable component of the feed air stream from nitrogen as a less readily permeable component thereof, said membrane module or modules not being individually insulated for the retention of heat therein;

(g) withdrawing nitrogen from the membrane system and from said insulated enclosure as non-permeate gas at essentially said feed air pressure; and (h) separately withdrawing oxygen and condensible water vapor from the membrane system and from said insulated enclosure as permeate gas at a lower pressure, whereby condensation of water from the feed air stream within the membrane system is effectively precluded.

2. The process of claim 1 in which said heat is supplied within the insulated enclosure by passing heat generated external to the air sepration process to said insulated enclosure.

3. The process of claim 2 in which said heat is supplied by the positioning of electric heater means within said insulated enclosure.

4. The process of claim 2 in which said heat is supplied by introducing steam to within said insulated enclosure.

5. The process of claim 1 in which the heat to superheat the feed air stream within the insulated enclosure is supplied by heat exchange means positioned within said insulated enclosure.

6. The process of claim 5 in which said heat exchange means is adapted to supply heat directly to said feed air stream.

7. The process of claim 6 in which the heat supplied to the feed air by said heat exchange means comprises heat recovered from the heat of compression generated upon compression of the feed air stream.

8. The process of claim 7 in which the feed air is compressed using an oil-flooded compressor, the heated oil from the compressor being passed to said heat exchange means to provide said heat required to superheat the feed air.

9. The process of claim 8 and including passing additional heat to the insulated enclosure, said additional heat comprising heat external to the air separation process.

10. An improved air separation system comprising:
(a) a permeable membrane system containing at least one membrane module capable of selectivley permeating oxygen, together with condensible water vapor, as a more readily permeable component of a feed air stream from nitrogen as a less readily permeable component thereof, said system including means for passing said feed air stream to the feed side of each said membrane module at a desired feed gas prssure, and for separately withdrawing nitrogen at essentially said feed air pressure level and oxygen and condensible water vapor as permeate gas at a lower pressure from each said module, each membrane module not being individually insulated for the retention of heat therein;

(b) heat supply means suitable for supplying sufficient heat to the feed air stream so as to superheat said feed air stream to a temperature above the saturation temperature of the feed air at the feed air pressure prior to the passage of said feed air to the permeable membrane system;

(c) an insulated enclosure surround said membrane system and said heat supplied by said heat supply means, said enclosure being insulated to control and/or minimize the loss of heat therefrom such that any loss of heat therefrom is not greater than the heat being supplied by said heat supply means so that the feed air passed to the uninsulated membrane module(s) is maintained under superheat conditions at a temperature above its dew point to avoid undesired condensation of water present in the feed air within the membrane system, said insulated enclosure being sufficiently large to permit operating personnel access thereto for servicing of the membrane system of uninsulated individual module(s);

(d) compression means for compressing the feed air stream containing condensible water vapor to a desired feed air pressure;

(e) an air cooling zone suitable for cooling the compressed feed air stream to below the design operating temperature level of the membrane system, thereby supersaturating the feed air so that said feed air stream comprises said feed air saturated with condensible water vapor together with free water droplets;

(f) liquid separation means for removing said free water droplets from the feed air stream; and (g) conduit means for passing the compressed, cooled feed air stream, free of water droplets, into said insulated enclosure without superheat of said feed air stream prior to its passage into said insulated enclosure containing membrane module(s) not individually insulated and without predrying of said feed air stream to a temperature dew point lower than said design operating temperature prior to said passage of the feed air stream into the insulated enclosure, whereby condensation of water from the feed air stream within the membrane system is effectively precluded.

11. The system of claim 10 in which said heat supply means for supplying heat generated external to the gas separation operation to said insulated enclosure.

12. The system of claim 11 in which said heat supply means comprises electric heater means positioned within said insulated enclosure.

13. The system of claim 11 in which said heat supply means comprises steam introduced to within said insulated enclosure.

14. The system of claim 10 in which said heat supply means comprises heat exchange means for supplying heat to said feed air stream within said insulated enclosure.

15. The system of claim 15 in which said heat exchange means is adapted to supply heat directly to said feed air stream.

16. The system of claim 15 and including means for recovering the heat of compression generated upon compression of the feed air stream by the compression means of element (d) and passing said heat to the heat exchange means within said insulated enclosure.

17. The system of claim 16 in which said compressor means comprises an oil-flooded compressor means, and including conduit means for passing oil heated in said compressor means to said heat exchange means.

18. The system of claim 17 and including control means for adjusting the amount of heated oil passed to said heat exchange means.

* * * * *